United States Patent [19]
Kitagishi et al.

[11] Patent Number: 4,974,947
[45] Date of Patent: Dec. 4, 1990

[54] REFRACTIVE INDEX DISTRIBUTION TYPE MENISCUS LENS AND OPTICS

[75] Inventors: Nozomu Kitagishi, Tokyo; Hiroki Nakayama, Yokohama, both of Japan

[73] Assignee: Canon Kabushiki Kaisha, Tokyo, Japan

[21] Appl. No.: 823,285

[22] Filed: Jan. 28, 1986

[30] Foreign Application Priority Data

Jan. 31, 1985 [JP] Japan .................................. 60-17059

[51] Int. Cl.$^5$ .......................... G02B 9/06; G02B 9/12
[52] U.S. Cl. .................................................. 350/413
[58] Field of Search ............................. 350/413, 96.31

[56] References Cited

U.S. PATENT DOCUMENTS

| | | | |
|---|---|---|---|
| 2,216,965 | 10/1940 | Sukumlyn | 350/413 |
| 3,718,383 | 2/1973 | Moore | 350/413 |
| 3,729,253 | 4/1973 | Moore et al. | 350/413 |
| 4,762,403 | 8/1988 | Hattori | 350/413 |

OTHER PUBLICATIONS

Introduction to Classical and Modern Optics, Second Edition, Jurgen R. Meyer-Arendt, M.D. pp. 362-365 (1984).

"Design of a Gradient-Index Photographic Objective", Applied Optics, vol. 21, No. 6, pp. 993-998 (Mar. 15, 1982).

"Gradient-Index Wide-Angle Photographic Objective Design", Applied Optics, vol. 23, No. 11, pp. 1735-1741 (Jun. 1, 1984).

*Primary Examiner*—Bruce Y. Arnold
*Assistant Examiner*—Rebecca D. Gass
*Attorney, Agent, or Firm*—Fitzpatrick, Cella, Harper & Scinto

[57] ABSTRACT

A refractive index distribution type meniscus-shaped single lens characterized in that it has a refractive index distribution in which the refractive index decreases along the optic axis thereof from a convex surface to a concave surface and the difference $\Delta N$ in refractive index between the convex surface and the concave surface on the optic axis satisfies $\Delta N \geq 0.15$.

4 Claims, 5 Drawing Sheets

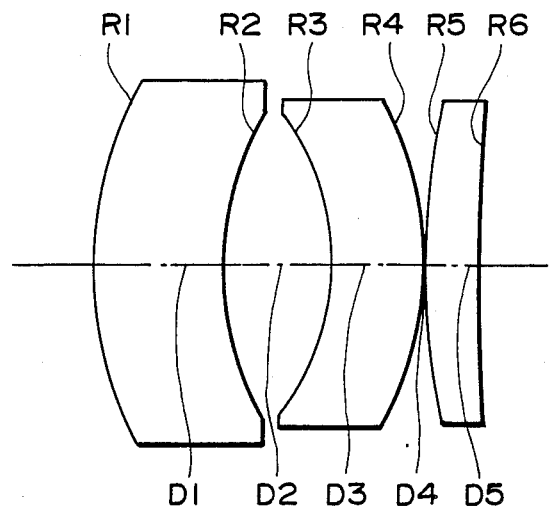
F I G. 5
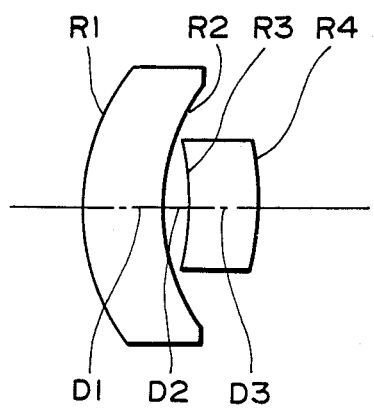
F I G. 7

REFRACTIVE INDEX DISTRIBUTION TYPE MENISCUS LENS AND OPTICS

BACKGROUND OF THE INVENTION

1. Field of the Invention

This invention relates to a meniscus lens having a refractive index distribution in the direction of the optic axis thereof.

2. Description of the Prior Art

In recent years, in various lens systems, the use of a refractive index distribution type lens having a refractive index distribution in a medium constituting the lens has been considered in order to reduce the number of component lenses and effect correction of aberrations. The index distribution type lenses are generally classified into a radial type lens having a refractive index distribution in the radial direction from the optic axis thereof, an axial type lens having a refractive index distribution in the direction of the optic axis thereof, and a spherical type lens comprising a combination of said two types. The axial type lens has an effect equal to that of a non-spherical surface and it is said that the contribution of the aberration coefficient thereof can be replaced with the contribution of the non-spherical surface. However, in spite of the fact that the axial type lens is easy to manufacture as compared with the radial type lens, the aberration correction effect of the axial type lens is smaller than that of the radial type lens, and there is known no example of the axial type lens in which attention is paid to the correction effect particularly for Petzval curvature of image field.

SUMMARY OF THE INVENTION

It is an object of the present invention to provide a refractive index distribution type meniscus lens which can readily correct various aberrations, particularly, the Petzval curvature of an image field.

It is a further object of the present invention to provide a lens system which is provided with said index distribution type meniscus lens and which can readily correct various aberrations.

To achieve the first object the index distribution type meniscus lens according to the present invention has a refractive index distribution in which the refractive index decreases along the optic axis of the meniscus lens from a convex surface to a concave surface and in which the difference $\Delta N$ in refractive index between said convex surface and said concave surface on the optic axis satisfies $\Delta N \geq 0.15$.

The present invention is applicable not only to an axial type lens, but also to a spherical type i.e., a lens having the center of concentric refractive index distribution outside the lens.

To achieve the above second object, the lens system according to the present invention is characterized in that it comprises a plurality of lenses and has two meniscus lenses disposed with their concave surfaces facing each other and at least one of said meniscus lenses comprises said index distribution type meniscus lens.

The refractive index distribution of the index distribution type meniscus lens according to the present invention, as previously described, is a refractive index distribution in which the refractive index decreases along the optical axis from the convex surface to the concave surface, but is not always a distribution in which the refractive index gradually decreases. The shape of said refractive index distribution is determined by the specification and case of manufacture of the present index distribution type meniscus lens. For example, in the case of a thick lens, the refractive index may decrease from the convex surface side and may intactly shift in the central portion and may again decrease toward the concave surface. Also, the refractive index may decrease from the convex surface side to the center, and then may intactly shift to the concave surface. What is important is that the difference $\Delta N$ in refractive index between the convex surface and the concave surface satisfies $\Delta N \geq 0.15$, and as the value of $\Delta N$ is greater, the correction effect of the curvature of the image field becomes greater.

BRIEF DESCRIPTION OF THE DRAWINGS

FIGS. 5 and 6 are a cross-sectional view and an aberration graph, respectively, showing another embodiment of the lens system according to the present invention.

FIGS. 7 and 8 are a cross-sectional view and an aberration graph, respectively, showing still another embodiment of the lens system according to the present invention.

DESCRIPTION OF THE PREFERRED EMBODIMENT

The correction effect of the Petzval curvature of image field of the index distribution type meniscus lens of the present invention will hereinafter be described with reference to FIG. 1.

Figure 1:
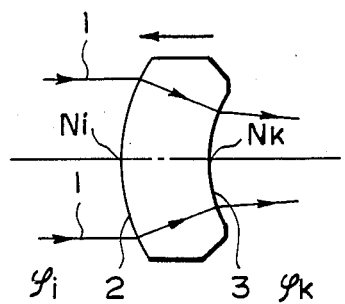
FIG. 1 illustrates the aberration correction effect of the index distribution type meniscus lens of the present invention.

FIG. 1 illustrates the correction effect of the Petzval curvature of image field of the index distribution type meniscus lens of the present invention. In FIG. 1, reference numeral 1 designates incident light rays, reference numeral 2 denotes a convex surface of a radius of curvature $R_p$, reference numeral 3 designates a concave surface of a radius of curvature $R_N$, reference characters $\theta i$ and Ni denote the power and refractive index, respectively, of the convex surface 2, and reference characters $\theta_k$ and $N_k$ designate the power and refractive index, respectively, of the concave surface 3. The meniscus lens shown in FIG. 1 varies continuously in refractive index in the direction of the optic axis, and the refractive index distribution thereof can be expressed by the following equation:

$$N(x) = N_0 + N_{01}X + N_{02}X^2 + \ldots,$$

where x represents the distance along the optic axis from the convex surface 2.

The sum Psum of the Petzval coefficients of the index distribution type meniscus lens of the present invention can generally be expressed by the following equation:

$$Psum = \theta i/Ni + \theta k/Nk$$

In the present invention, $|Ni - Nk| > \gtrsim 0.15$ is satisfied. In order to increase the negative generation of the Petzval coefficient in the second term of the right side of the above equation, the first term of the right side having a positive Petzval coefficient and the Petzval coefficient negate each other. Accordingly, the sum of the Petzval coefficients is very small, and the index distribution type meniscus lens of the present invention has an effect equal to that of a cemented lens comprising a convex lens of a high refractive index and a concave lens of a low refractive index cemented together. However, in the ordinary cemented lens, the curvature of the cemented surface is great and the difference in refractive index in the cemented surface is also great and therefore, high-order aberration occur. While the index distribution type meniscus lens of the present invention has a refractive index distribution therein and has no cemented surface and therefore, occurrence of high-order aberrations can be suppressed and Petzval curvature of image field can be readily corrected. Also, by the lens being given a predetermined refractive index distribution, the incident light rays enter a portion of a low refractive index away from the optic axis and thus, occurrence of spherical aberration can be reduced. Although, in the present illustration, the lens has its convex surface 2 facing the object side, a similar effect may be obtained even if the convex surface 2 faces the image side.

As described above, the index distribution type meniscus lens of the present invention can readily correct the Petzval curvature of image field and at the same time can accomplish the correction of spherical aberration. However, by the radius of curvature RN of the concave surface 3 satisfying the following formula (1), a further effect can be obtained:

$$0.2f < RN < f \quad (1),$$

where f represents the focal length of the index distribution type meniscus lens of the present invention. It is to be understood that the sign of f does not affect the sign of RN.

If the radius of curvature RN exceeds the upper limit of formula (1), the correction effect of Petzval curvature of image field will become small, and if the radius of curvature RN exceeds the lower limit of formula (1), correction of various aberrations will become difficult. Also, if the ratio Rp/RN between the radii of curvature of the convex surface 2 and the concave surface 3 exceeds the lower limit of the following formula (2), the correction effect of Petzval curvature of image field will be lost, and if said ratio Rp/RN exceeds the upper limit of the following formula (2), correction of spherical aberration will become difficult.

$$0.8 < Rp/RN < 2.5 \quad (2),$$

Also, where, in a lens system comprising a plurality of lenses, two meniscus lenses are disposed with the concave surfaces thereof facing each other and at least one of the meniscus lenses is the index distribution type meniscus lens of the present invention, not only the above-mentioned Petzval curvature of image field and spherical aberration but also asymmetry aberrations such as coma and distortion can be corrected at the same time. Accordingly, by using the index distribution type meniscus lens and lens system according to the present invention in various lens systems, it is possible to decrease the number of lenses constituting the lens system and achieve a compact lens system.

On the side of the concave lens surface, the lens protrudes from the position at which the lens surface intersects the optic axis, but the refractive index distribution of this portion can be chosen to a desired shape to utilize the effect of a non-spherical surface.

Figure 2:
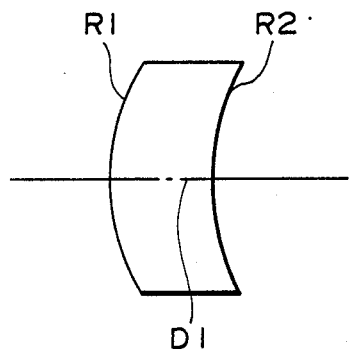
FIG. 2 is a cross-sectional view showing an embodiment of the index distribution type meniscus lens of the present invention.

FIG. 2 shows an example of an index distribution type meniscus single lens having a positive refractive power. In FIG. 2, reference character R1 designates the radius of curvature of the convex surface, reference character R2 denotes the radius of curvature of the concave surface, and reference character D1 designates the on-axis thickness between the convex surface and the concave surface. The refractive index distribution in the present embodiment is expressed by the following equation, but D1=0.1.

$$N(x) = 1.75 - 2x$$

Accordingly, the difference $\Delta N$ in refractive index between the convex surface and the concave surface is 0.20, and both spherical aberration and Petzval curvature of image field can be readily corrected as shown in the table below. In the case of a homogeneous meniscus lens having a refractive index of 1.75, the third-order aberration coefficient of spherical aberration and the sum of Petzval coefficients are of the order of 21.18 and 0.26, respectively, and it is seen that the effect of the present index distribution type meniscus lens is great. Accordingly, the lens system can be constituted by a small number of lenses. The lens data, the spherical aberration and the sum of Petzval coefficients of the present embodiment will be shown. It is to be noted that the numerical values of the lens data are normalized with the focal length as 1.

| Lens Data | | |
|---|---|---|
| Radius of curvature | On-axis thickness or on-axis air space | Refractive index |
| R1 = 0.22 | D1 = 0.1 | |
| R2 = 0.1880 | | N(x) |
| | N(x) = 1.75 − 2x | |

| | Spherical aberration coefficient | Petzval coefficient |
|---|---|---|
| 1 | −18.0062 | 1.9048 |
| 1-transfer term | 2.9727 | 0 |
| 2 | 19.6578 | −1.8871 |
| Total | 4.6243 | 0.0177 |

Figure 3:
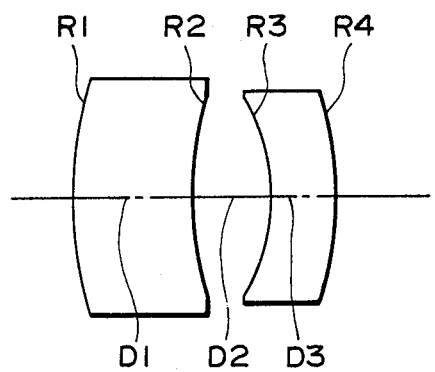
FIGS. 3 and 4 are a cross-sectional view and an aberration graph, respectively, showing an embodiment of the lens system according to the present invention.
Figure 4:
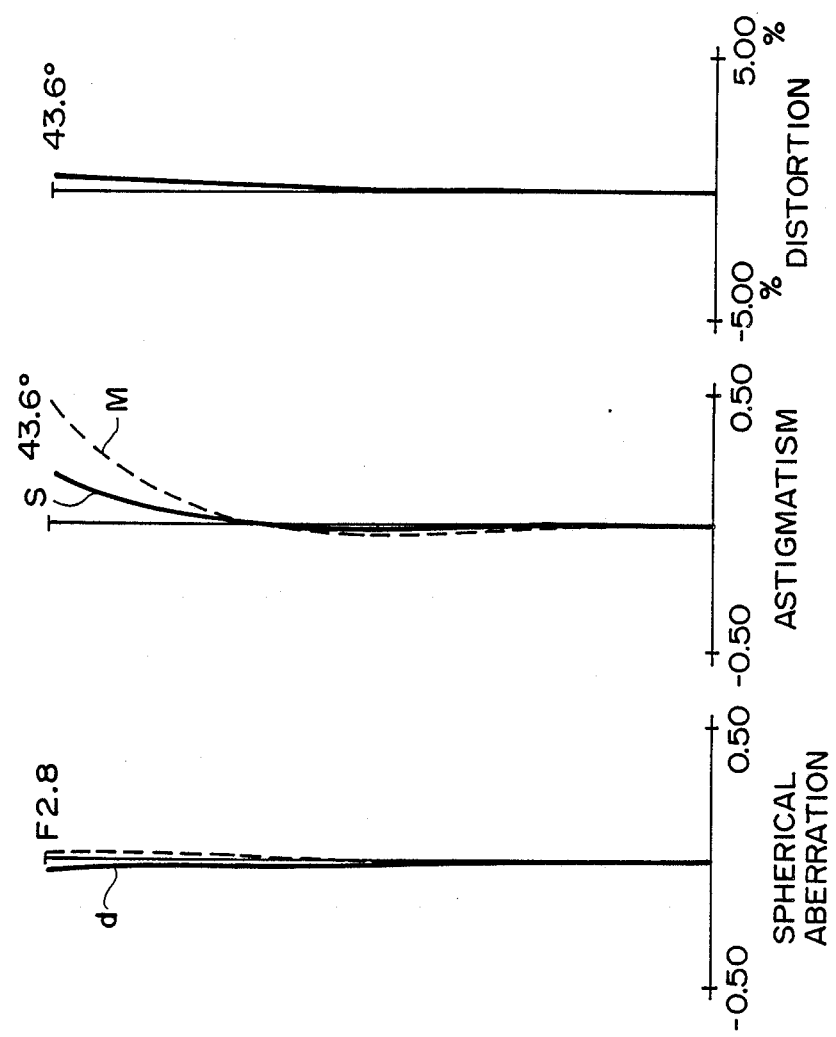

FIGS. 3 and 4 are a cross-sectional view and an aberration graph, respectively, showing an embodiment of the lens according to the present invention. In FIG. 3, R1–R4 designate the radii of curvature of respective surfaces, and D1–D3 denote the on-axis air spaces or the on-axis thicknesses of the surfaces having R1–R4. FIG. 4 shows the spherical aberration, astigmatism and distortion of the present embodiment, and the focal length is 35 mm, the F-number is 2.8, and the angle of view is 43.6°. The present embodiment comprises, in succession from the object side, a meniscus lens comprising surfaces of radii of curvature R1 and R2, and a meniscus lens disposed symmetrically with respect to said meniscus lens and comprising surfaces of radii of curvature R3 and R4, and both of these meniscus lenses have a refractive index distribution in which the refractive index decreases along the optic axis from the convex surface to the concave surface. With such a construction, Petzval curvature of image field can be well corrected and moreover, spherical aberration, coma and distortion can be minimized.

The lens data and refractive index distribution of the present and following embodiments will be shown in Tables 1 to 3 given at the end of this specification. In these Tables, Rn(n=1,2,3,...) represents the radius of curvature of the nth surface as viewed from the object side, Dn(n=1,2,3,...) represents the on-axis air space or the on-axis thickness between the nth surface and the (n+1)th surface, and N1, N2 and N3 represent the refractive indices of the first, second and third lenses, respectively, as viewed from the object side.

Figure 6:
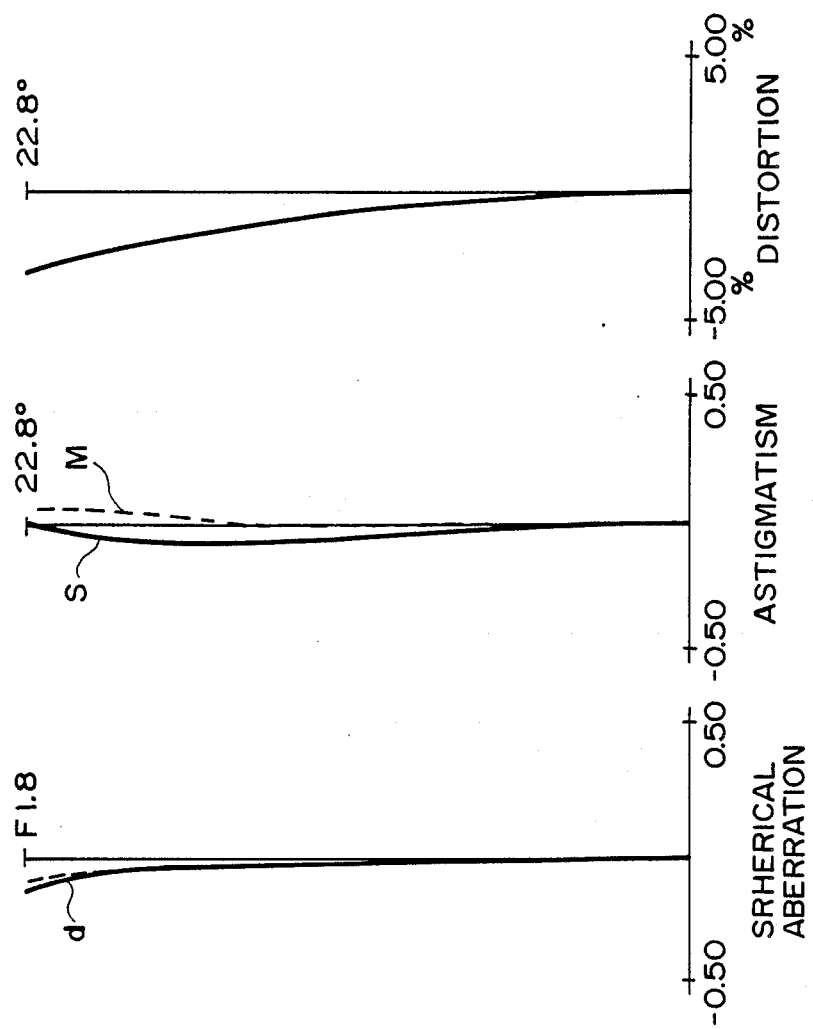

FIGS. 5 and 6 are a cross-sectional view and an aberration graph, respectively, showing another embodiment of the present invention. This embodiment comprises, in succession from the object side, an index distribution type meniscus lens comprising surfaces of radii of curvature R1 and R2, an index distribution type meniscus lens comprising surfaces of radii of curvature R3 and R4, and a positive lens of homogeneous medium comprising surfaces of radii of curvature R5 and R6. In the present embodiment, the radii of curvature of the concave surfaces of the two meniscus lenses are made smaller and the positive lens is provided rearwardly of the pair of meniscus lenses, whereby the correction effect of Petzval curvature of image field is further intensified. By the lens of the present invention being thus combined with other lenses or being used as a part of various lens systems, various aberrations can be readily corrected. The lens data and refractive index distribution of the present embodiment will be shown in Table 2 below.

Figure 8:
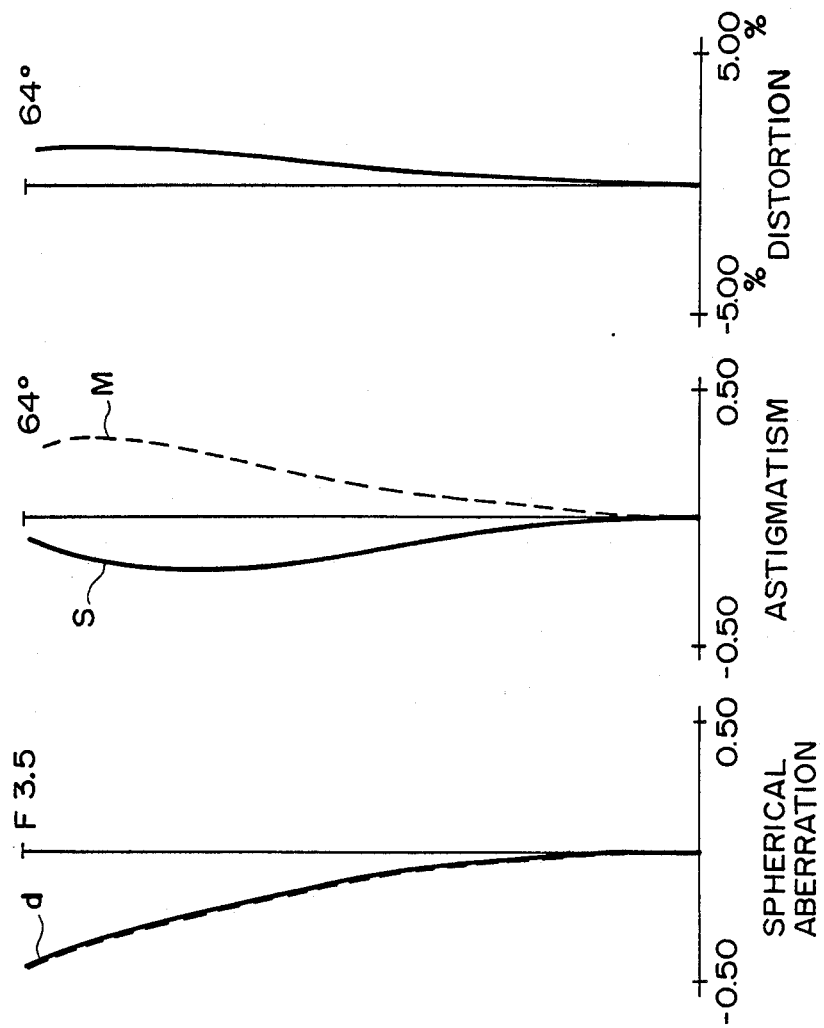

FIGS. 7 and 8 are a cross-sectional view and an aberration graph, respectively, showing still another embodiment of the present invention. The present embodiment comprises, in succession from the object side, an index distribution type meniscus lens comprising surfaces of radii of curvature R1 and R2, and an index distribution type meniscus lens comprising surfaces of radii of curvature R3 and R4, and has an angle of view of 64° greater than that of the previous embodiment. The effect of the present embodiment is similar to that of the previous embodiment, and the lens data and refractive index distribution of the present embodiment will be shown in Table 3 below.

TABLE 1

| f = 35 mm, FNo = 2.8, 2w = 43.6° | | |
|---|---|---|
| Radius of curvature | On-axis air space or on-axis thickness | Refractive index |
| R1 = 25.675 | D1 = 6.48 | N1 = N1(x) |
| R2 = 20.011 | D2 = 423 | |
| R3 = -11.609 | D3 = 3.63 | N2 = N2(x) |
| R4 = -17.993 | | |

$N_1(x) = 1.8061 - 0.0718x - 0.00103x^2 + 0.000238x^3$
$N_2(x) = 1.6668 + 0.1127x + 0.00882x^2 + 0.0008673x^3$

TABLE 2

| f = 35 mm, FNo = 1.8, 2w = 22.8° | | |
|---|---|---|
| Radius of curvature | On-axis air space or on-axis thickness | Refractive index |
| R1 = 20.552 | D1 = 7.00 | N1 = N1(x) |
| R2 = 17.185 | D2 = 5.80 | |
| R3 = -13.428 | D3 = 4.92 | N2 = N2(x) |
| R4 = -19.099 | D4 = 0.99 | |
| R5 = 37.750 | D5 = 3.00 | N3 = 1.8061 |
| R6 = 122.204 | | |

$N1(x) = 1.8061 - 0.02839x - 0.0003476x^2 + 0.00011776x^3$
$N2(x) = 1.6668 + 0.06130x + 0.0012143x^2 + 0.00009207x^3$

TABLE 3

| f = 24 mm, FNo = 3.5, 2w = 64° | | |
|---|---|---|
| Radius of curvature | On-axis air space or on-axis thickness | Refractive index |
| R1 = 11.630 | D1 = 4.16 | N1 = N1(x) |
| R2 = 10.381 | D2 = 1.44 | |
| R3 = -16.611 | D3 = 3.20 | N2 = N2(x) |
| R4 = -16.570 | | |

$N1(x) = 1.85 - 6.5465 \times 10^{-2}x$
$N2(x) = 1.50 + 8.1159 \times 10^{-2}x$

As described above, the index distribution type meniscus lens according to the present invention is a lens which can readily correct the Petzval curvature of an image field and can suppress occurrence of spherical aberration.

Further, by the present index distribution type meniscus lens being used as at least one of a pair of symmetrically disposed meniscus lenses, not only curvature of image field and spherical aberration but also asymmetry aberration such as coma and distortion can be corrected.

We claim:

1. An optical system comprising a plurality of lenses, of which two of the lenses are meniscus lenses having concave surfaces facing each other, at least one of said lenses having a refractive index distribution in which the refractive index continuously decreases from a point at the intersection of a convex lens surface and an optical axis to a point at the intersection of a concave lens surface and said optical axis, and satisfying $\Delta N \geq 0.15$ where $\Delta N$ is the difference between the refractive indices of the convex lens surface and the concave lens surface on said optical axis.

2. An optical system according to claim 1, wherein said meniscus lenses have their concave surfaces facing each other.

3. An optical system according to claim 1, satisfying $0.2f < RN < f$ $0.8 < RP/RN < 2.5$, where RP is the radius of curvature of the convex lens surface, RN is the radius of curvature of the concave lens surface, and f is the focal length of the lens.

4. An optical system according to claim 1, wherein said optical system has a positive lens adjacently located to said meniscus lenses.

* * * * *

UNITED STATES PATENT AND TRADEMARK OFFICE
CERTIFICATE OF CORRECTION

PATENT NO. : 4,974,947
DATED : December 4, 1990
INVENTOR(S) : Nozomu Kitagishi, et al.

It is certified that error appears in the above-identified patent and that said Letters Patent is hereby corrected as shown below:

FIG. 6     (Sheet 4):

"SRHERICAL" should read --SPHERICAL--.

COLUMN 1:

Line 32, "Petzval" should read --the Petzval--.

COLUMN 5:

Table 1, "D2 = 423" should read --D2 = 4.23--.

COLUMN 6:

Line 52, "satistying" should read --satisfying--.

Signed and Sealed this

Fourth Day of August, 1992

Attest:

DOUGLAS B. COMER

Attesting Officer        Acting Commissioner of Patents and Trademarks